United States Patent [19]

Cosper

[11] Patent Number: 5,324,770
[45] Date of Patent: Jun. 28, 1994

[54] ETHYLENE OXIDE/PROPYLENE OXIDE BLOCK COPOLYMERS AS GREEN BINDERS FOR CERAMICS

[75] Inventor: David R. Cosper, Downers Grove, Ill.

[73] Assignee: Nalco Chemical Company, Naperville, Ill.

[21] Appl. No.: 900,503

[22] Filed: Jun. 17, 1992

Related U.S. Application Data

[63] Continuation of Ser. No. 712,261, Jun. 7, 1991, abandoned.

[51] Int. Cl.$^5$ ............................................. C08L 39/06
[52] U.S. Cl. .................................... 524/516; 524/413; 524/430; 524/515; 523/139
[58] Field of Search ............... 524/413, 515, 516, 430, 524/413, 515, 516; 523/139

[56] References Cited

U.S. PATENT DOCUMENTS

4,638,029 1/1987 Meschke et al. .................... 524/430
4,898,902 2/1990 Nagai et al. .......................... 524/275

OTHER PUBLICATIONS

Chemical Abstract No. 120023w, 1990, American Chemical Society.

*Primary Examiner*—Paul R. Michl
*Assistant Examiner*—John J. Guarriello
*Attorney, Agent, or Firm*—Dressler, Goldsmith, Shore & Milnamow

[57] ABSTRACT

The present invention comprises block copolymers of alkylene oxides, such as ethylene oxide and propylene oxide, which are further formulated with additional polymers such as poly(N-vinylpyrrolidinone), poly(vinyl alcohol), and certain low foam additives. These polymers are useful for the coating of alumina powders for use in ceramics. In aqueous media, their lower viscosities enable facile spray drying of the coated alumina powders. The coated alumina powders may be compressed under relatively low pressure into high density forms with superior unfired compressive strengths (green strength), they are surprisingly insensitive to relative humidity, are readily ejected from the mold, and finally do not have a deleterious effect upon the ultimate high temperature sintering of the formed bodies.

7 Claims, No Drawings

ETHYLENE OXIDE/PROPYLENE OXIDE BLOCK COPOLYMERS AS GREEN BINDERS FOR CERAMICS

This application is a division, of application Ser. No. 07/712,261, filed Jun. 7, 1991, now abandoned.

BACKGROUND OF THE INVENTION

The formation of ceramic shapes from ceramic powders normally involves pressing or extrusion of a mixture of the ceramic powders and various additives so that a dense cohesive structure is formed which is then heated in a kiln (fired) to destroy any residual organic components and to promote the sintering of the inorganic powder so that further densification and strengthening results. It is essential to produce a final structure with minimal free voids between ceramic powder particles in order to achieve the highest possible density and tensile strengths of the green and sintered bodies. Although pressure of formation plays an important role in densification, pressing under high loads (>100 MPa) will not convert ceramic powder alone into a firm body. The shape formed in this manner would simply crumble when ejected from the die or mold. Organic binders are used to overcome these problems. Organic binders provide lubricity to facilitate the compression of the green structure into a high density form, and adhesion so that the "green", unfired, body holds together. Upon firing and the onset of sintering, the organic binder is no longer required. Complete pyrolysis of the organic material present, so that there are no residues which might adversely affect the sintering process, occurs in the early stages of the firing process.

In practice, the ceramic powder, e.g., alumina, is dispersed in a liquid carrier (water or organic) with the aid of chemical dispersants and mechanical action. A dispersant is necessary in order to make a stable, liquid dispersion at high solids. Although a variety of materials may be used for this function, frequently a low molecular weight poly(acrylic acid) as its sodium or ammonium salt is used. The level of use of this dispersant is usually in the range of 0.05–0.5% by weight based on alumina. Other dispersants that have been used are poly(methacrylic acid) salts and lignosulfonic acid salts. An organic polymeric binder and other functional materials such as lubricants and sintering aids are then added. The resulting slurry or slip is spray dried to yield a free-flowing powder consisting of spherical agglomerates (granules) of about 50–200 micrometer diameter. Approximately 2–8% binder (based on the dry weight of powder) is commonly used. The formulated powder can next be pressed to the desired shape in a suitable die from which it is then ejected.

The viscosity of the complete slurry must be suitable for necessary handling and spray drying. Although spray dry equipment and running conditions may be adjusted to handle a variety of viscosities, larger particles will result from higher viscosity slurries. The resultant large particles may result in larger interstices between particles and hence a lower strength. The binder may contribute to viscosity of the continuous phase of the slurry by virtue of its molecular weight, solubility, conformation in solution, and possible incompatibility with the combination of powder and dispersant. The spray-dried blend of powder and binder must be free flowing so that it can completely fill dies.

The resulting compacted part must be smoothly ejected, be as dense as possible, and not suffer significant dimensional change from that of the die. Chemical additives have a major effect on the desired lubricity. Polyethylene oxides and fatty acid derivatives promote lubrication (the former may also behave as a binder). During dry pressing, the granules are deformed and the binder flows to fill available space, thus increasing density. The glass transition temperature (Tg) of the polymer can have a strong effect in this step. Polymers with too high a glass transition temperature will not flow and as a result cohesion of the pressed part does not occur. Under these conditions, the compressed powder will undergo stress relaxation in the form of expansion on release from the die. This phenomenon is referred to as "springback" and is undesirable from the standpoint of dimensional accuracy as well as density and strength. For this reason, plasticizers are used with higher Tg polymers. Frequently, mixtures of polymers having greatly different physical properties are used as binders. For example, a plastic material such as polyethylene oxide may be blended with a film-forming binder such as polyvinyl alcohol to give an effective ceramic binder.

The polymer binders currently used for the binding of ceramic powders have, as a class, not been specifically synthesized for optimal densification and green strength of ceramic forms. Rather, they are commercially available materials, with other principal uses, which have been adapted for use in ceramic manufacture and include such materials as cellulose ethers, polysaccharides, polyacrylic latexes, poly(2-ethyl-2-oxazoline), poly(ethylene oxide), poly(vinyl alcohol), poly(vinyl butyral), and wax. Of these, poly(2-ethyl-2-oxazoline), poly(ethylene oxide), poly(vinyl alcohol), and wax are used in the spray drying process.

The principal function of the binder is to hold the compacted form together after pressing. The method utilized for determination of suitable "green strength" is the diametral compression strength or DCS of a cylindrical section across its diameter. DCS is actually a measure of tensile strength. The unit of measurement of the pressure tolerance is the megapascal (MPa). Typical values for DCS of "green" parts are in the range 0.3–3.0 MPa. It should be recognized that the strength of the green part is largely a function of the state of the binder phase. If the binder does not flow (as in the case of too high a Tg), or if it is a liquid (as in the case of too low a Tg), a weak non-coherent green part will result. The binder must coat/wet the ceramic powder, flow easily at the pressure and temperature of the die, and be cohesive at the test temperature.

Binders must be cost effective and highly soluble in water or suitable organic solvents, such as alcohols, toluene, or xylene.

Oxide ceramics absorb atmospheric moisture. Since water is known to plasticize alumina and many hydrophilic organics, alumina green bodies will lose strength when exposed to humid conditions (R. A. Dihilia et al, *Advan. Ceram.* 9, 38–46 (1984); C. E. Scott et al, *Amer. Ceram. Soc. Bull.* 61 (5), 579–581 (1982). Binders which would have less sensitivity to moisture, without loss of cohesive strength, would clearly be advantageous.

In summary, a preferred binder for ceramic powders would be soluble in water and a wide range of organic solvents. This ideal binder would be suitable for all ceramic powders and form easily spray-dried mixtures, be compatible with all dispersants and even function itself as a dispersant. It would allow pressing to maximum density with minimal pressure and eject easily from the die. Springback would not occur. It would not require a separate plasticizer or be sensitive to atmospheric moisture. The ideal binder would not leave any deleterious residues during the burn out and firing.

Although poly(ethylene oxides) or poly(ethylene glycols) are commonly used as a binder for ceramics in industry, they have some deficiencies. The use of poly(ethylene oxides) is generally limited to aqueous processes where they produce slurries of high viscosity. They have solubility only in methanol and methylene chloride at ambient temperature. These two solvents are very low boiling and toxic.

Poly(2-ethyl-2-oxazoline) is more expensive than the polyethylene glycol-type resins. It has as an advantage a low molecular weight which gives rise to low aqueous system viscosities. A deficiency of this resin is its high Tg (70 C) which is too high for normal processing and must therefore be admixed with a plasticizer (PEG 400). This polyether however renders poly(2-ethyl-2-oxazoline) formulations hygroscopic. Poly(vinyl alcohol) also requires plasticizing.

The various acrylic latex type binders produce very desirable low viscosity slips. The dried powders, however, are very hard and do not press well.

Aluminum oxide (alumina) is by far the most widely used powder in technical ceramics. Zirconium oxide (zirconia), beryllium oxide (beryllia), and other oxides are used in special applications as are the non-oxides, silicon carbide and silicon nitride.

SUMMARY OF THE INVENTION

The present invention comprises a ceramic binder composition comprising block copolymers of alkylene oxides, such as ethylene oxide and propylene oxide, which are water-soluble and are solids at room temperature yet plastic enough to deform during pressing, which are further formulated with water-soluble, film-forming polymers such as poly(N-vinylpyrrolidinone) and poly(vinyl alcohol) and their copolymers. These polymer blends are useful as binders for alumina powders for use in ceramics. In aqueous media, their lower viscosities enable facile spray drying. The dried alumina powders may be compressed under relatively low pressure into high density forms with superior unfired strengths. They are only moderately affected by humidity, are readily ejected from the die and burn off cleanly in the initial stages of firing.

The preferred binders consist of ethylene oxide/propylene oxide block copolymers containing 70–80 weight % ethylene oxide and bearing terminal ethylene oxide blocks with molecular weights in the 5,000 to 20,000 range which are further formulated with film-forming polymers such as homopolymers or copolymers of N-vinylpyrrolidinone.

DETAILED DESCRIPTION OF THE INVENTION

Examples of the block copolymer useful in the present invention are the simple A-B-A copoly(ethylene oxide-propylene oxide) condensates and copoly(ethylene oxide-propylene oxide) ether-linked to (1,2-ethandiyldinitrilo) tetrakis[propanol] (4:1) (CAS 11111-34-5). These copolymers are produced by a number of chemical companies including BASF, GAF, Mazer Chemicals and Nalco Chemical Co. among others. The molecular weights of the ethylene oxide-propylene oxide block copolymers which are most effective green strength binders lie in the range of 5,000 to 20,000. Optimal performance of these condensates is achieved by further formulation with various additives. The hydrophilic ether block copolymers are surface active and lead to foaming in slip compositions. This is undesirable in that it interferes with pumping and spray drying of the slurry. To overcome this difficulty, a suitable antifoaming agent is employed. An example of such a defoamer is 2,4,7,9-tetramethyl-5-decyn-4,7-diol (marketed by Air Products Corporation as Surfynol 104). This material will not interfere with the compaction, green strength, springback, or sintering of the ceramic part. Other suitable defoamers include hydrophobic, low molecular weight (<10,000) ethylene oxide/propylene oxide block coplymers containing about 80–90 weight % propylene oxide; linear aliphatic alcohols such as 1-heptanol, 1-octanol and 1-decanol (however, 1-dodecanol is not suitable); and poly(dimethylsiloxanes) which are common active ingredients of antifoams.

Other materials which do not interfere in the above factors may also be used such as hydrophobic block copolymers of ethylene oxide/propylene oxide. Antifoam agents may be incorporated at a level of less than 5%, preferably 0.5–2.5% of the total dry weight binder composition, and post preferably 1.0–2.0% total dry weight binder composition.

Although the examples of this invention describe block copolymers of ethylene oxide and propylene oxide, this does not preclude the use of hydrophobic center blocks other than propylene oxide. Thus, the central block may be, for example, derived from polyether producing monomers such as 1-butene oxide, 2-butene oxide, styrene oxide, tetrahydrofuran and dimethyl oxetane. The center block may be composed of hydroxy terminated low molecular weight polymers such as hydroxy terminated polybutadiene or hydroxy terminated polyesters. Still further variations contemplated in this invention are low molecular weight center blocks wherein the terminal groups have the capacity to react with ethylene oxide such as amine terminated polyamides, carboxyl terminated polyamides, carboxyl terminated polyesters, hydroxy terminated polyurethanes, amine terminated polyurethanes, amine terminated polyurea resins, amine terminated poly propylene oxide resins (Jeffamines), and similar materials.

Performance of the binder resin can be substantially improved through the addition of film-forming polymers such as poly (N-vinylpyrrolidinone) (PVP) (GAF or BASF Corporations), or poly(vinyl alcohol). The addition of 20–60% PVP basis the dry weight of the formulated binder produces significant increases in green DCS and with only modest decreases in density.

The present invention can be more readily understood by the following representative examples using the test methods specified.

TEST METHODS

Preparation Of Air-Dried Powders. Powdered mixtures of alumina and binder were prepared by dispersion, air drying, crushing and sieving. For example, 100 g of alumina (Alcoa A16SG) was added slowly to a rapidly-stirred solution of 0.20 g of a 31.7% aqueous solution of ammonium polyacrylate in 40.0 g of deionized water with vigorous mixing (cage mixer). The concentrated binder solution was then added and stirring continued for 20 minutes. This finished slurry was then poured into a flat aluminum tray and allowed to air dry for 24 hours at 50% relative humidity and 22° C. The dried material was then crushed in a mortar and pestle and sieved. The entire −40 fraction was retained for testing.

Preparation Of Spray-Dried Powders

Formulated alumina-binder slurries were also dried using a Yamato Model DL-41 laboratory spray dryer. These slurries were ball milled overnight and screened through a 100-mesh wire before drying. For routine work, the slurry was fed at 35 ml/min, with atomizing air set at 33 L/min. Drying air flow was set at 0.6 m³/min and drying air temperature at 250° C. These settings were found to give an acceptably dry powder. Typically, powders of about 130–150 μm diameter (weight average) were produced. The powder was stored under controlled humidity conditions for three days before pressing. Typically particles larger than 60 mesh and smaller than 325 mesh were not used. This was done to approximate the particle sizes produced in a commercial scale spray dryer. Controlled humidity was produced in desiccators containing either anhydrous calcium sulfate (Drierite) or various saturated aqueous salt solutions.

Preparation Of Ceramic Green Bodies. Test pieces were made by pressing 20.0 g of sieved powder in a cylindrical hardened tool steel die (interior diameter 28.57 mm) on a Carver Model-M 25 ton laboratory press equipped with time and pressure release controls. Maximum pressure was typically 5,000 to 25,000 psi. Press closure speed was usually set at 8.4 mm/sec. Test pieces were ejected from the die and stored at controlled relative humidity for at least 24 hours before testing.

Testing Of Green Ceramic Bodies. Densities were determined by measuring the height, diameter and weight of the test cylinders. Height was an average of six determinations and diameter of three determinations. Weight was measured to the nearest 0.0001 g. Densities were corrected for binder content. Strength was measured as diametral compression strength (DCS) on a Hinde and Dauch Crush Tester in a controlled atmosphere (22° C., 50% relative humidity). DCS is actually a tensile measurement in which the test piece is placed on edge and split along its diameter. Forming and testing of green ceramics are vulnerable to environmental variations. For this reason, it is imperative to run internal controls.

EXAMPLE 1

The effects of molecular weight and/or the ethylene oxide content of the various polyethers studied is demonstrated in this set of experiments. The materials used were alumina A16SG from Alcoa Corporation, poly(ethylene oxide) resins from Union Carbide, and several Tetronic resins from BASF Corporation. The alumina was treated with 5% binder, air-dried, equilibrated at 0% relative humidity at room temperature, pressed at 16,000 psi, and tested according to the methods described above. The densities recorded were corrected for the binder content.

| | COMPARISON OF VARIOUS POLYETHERS ON GREEN PROPERTIES | | | | |
|---|---|---|---|---|---|
| | | PROPYLENE | | GREEN CERAMIC PROPERTIES | |
| POLYETHER | POLYETHER TYPE | OXIDE WT. % | MOL. WT. × 0.001 | DENSITY g/cc | DCS MPa |
| A | PEO | 0 | 1.0 | 2.241 | 0.278 |
| B | PEO | 0 | 8.0 | 2.181 | 0.308 |
| C | PEO-M | 0 | 20 | 2.188 | 0.544 |
| D | PEO | 0 | 300 | 2.153 | 0.599 |
| E | EO-PO-EDA-PO-EO | 60 | 6.7 | 2.230 | 0.264 |
| F | EO-PO-EDA-PO-EO | 30 | 12.2 | 2.232 | 0.749 |
| G | EO-PO-EDA-PO-EO | 20 | 25 | 2.202 | 0.700 |
| H | PO-EO-EDA-EO-PO | 20 | 18.7 | 2.230 | 0.535 |

PEO = polyethylene oxide;
PEO-M = polyethylene oxide cross-linked with 2,2'-[(1-methylethylidene)bis(4,1 phenyleneoxymethylene)]bisoxirane;
EO-PO-EDA-PO-EO = copoly(ethylene oxide-propylene oxide) ether-linked to (1,2-ethandiyldinitrilo)tetrakis[propanol] (4:1) (CAS 11111-34-5).

These data show the superior compaction and green strength properties of EO-PO block copolymers compared to polyethylene oxides of comparable molecular weight.

EXAMPLE 2

These experiments demonstrate the effect of added poly(N-vinylpyrrolidinone) on the performance of an EO/PO block copolymer (polyether F in Example 1). As in Example 1, the alumina used was A16SG from Alcoa Corporation. Poly(N-vinylpyrrolidinone) is available commercially from BASF Corporation and from GAF Chemicals. The two PVP resins used in the study were K15 (molecular weight of 10,000) and K30 (molecular weight of 40,000). The powder samples were prepared by spray drying at 250° C., pressed at 16,000 psi, and tested as described under TEST METHODS. Powders and test pieces were equilibrated at 0% R.H.

| EFFECT OF PVP ON PERFORMANCE OF EO/PO SAMPLE F | | | |
|---|---|---|---|
| (All formulations contain 2%, by weight based on EO/OP polymer, of antifoam.) | | | |
| | | GREEN CERAMIC PROPERTIES | |
| | WT. | DENSITY | |
| PVP TYPE | %- PVP | g/cc | DCS (MPa) |
| F-1 | None (control) | 0.0 | 2.284 | 0.612 |
| F-2 | PVP-K15 | 20.0 | 2.263 | 1.270 |
| F-3 | " | 40.0 | 2.255 | 1.980 |
| F-4 | " | 60.0 | 2.248 | 2.773 |
| F-5 | " | 80.0 | 2.231 | 1.768 |
| F-6 | PVP-K30 | 20.0 | 2.267 | 1.804 |
| F-7 | " | 40.0 | 2.227 | 1.390 |
| F-8 | " | 60.0 | 2.172 | 0.713 |
| F-9 | " | 80.0 | 2.125 | 0.262 |

EXAMPLE 3

This example determined the effect of compacting pressures on A16SG alumina treated with 5% formulated binders. The powders were prepared and pressed as in Example 2.

These comparisons demonstrate the weakness of PVP as a binder and the superior performance of blends of PVP with an EO/PO block copolymer. The absolute values of strength and density are lower than those shown in Example 2. This shows the susceptibility of testing of green ceramics to environmental variations and the need to run controls.

| BINDER COMPONENT | F-10 |
|---|---|
| Polyether F (Example 1) | 49.0% |
| Surfynol 104 | 1.0% |
| PVP-K15 | 50.0% |

PERFORMANCE DATA

| | | GREEN CERAMIC PROPERTIES | |
|---|---|---|---|
| BINDER | PRESSURE psi × 0.001 | DENSITY g/cc | DCS MPa |
| F-6 | 12 | 2.231 | 1.060 |
| F-10 | " | 2.167 | 0.759 |
| F1 | " | 2.257 | 0.604 |
| PVP-K15 | " | 2.108 | 0.169 |
| C | " | 2.182 | 0.252 |
| F-6 | 20 | 2.275 | 1.363 |
| F-10 | " | 2.237 | 1.213 |
| F-1 | " | 2.310 | 0.885 |
| PVP-K15 | " | 2.194 | 0.362 |
| C | " | 2.227 | 0.416 |
| F-6 | 24 | 2.284 | 1.049 |
| F-10 | " | 2.253 | 1.162 |
| F1 | " | 2.296 | 0.593 |
| PVP-K15 | " | 2.215 | 0.389 |
| C | " | 2.226 | 0.416 |

EXAMPLE 4

This example demonstrated the effect of relative humidity on the physical properties of the green parts. Powders and compacts were prepared as in Example 3, pressing at 16,000 psi. Powders and compacts were equilibrated at 0%, 20% or 52% relative humidity.

Increasing humidity results in higher densities which in these experiments leads to higher green strengths.

EFFECT OF RELATIVE HUMIDITY ON GREEN PROPERTIES

| | RELATIVE | GREEN CERAMIC PROPERTIES | |
|---|---|---|---|
| BINDER | HUMIDITY % | DENSITY g/c | DCS MPa |
| F-6 | 0 | 2.226 | 0.479 |
| " | 20 | 2.224 | 0.440 |
| " | 52 | 2.274 | 0.666 |
| F-10 | 0 | 2.190 | 0.636 |
| " | 20 | 2.218 | 0.611 |
| " | 52 | 2.279 | 0.888 |

EXAMPLE 5

This example demonstrates the interrelationship between the effects of relative humidity and compression pressure on the physical properties of the green parts. The samples were prepared and tested according to the methods outlined in Example 1.

EFFECT OF R.H. AND COMPACTING PRESSURE ON GREEN PROPERTIES

| | | PRESSURE | GREEN CERAMIC PROPERTIES | |
|---|---|---|---|---|
| BINDER | R.H. % | psi × 0.001 | DENSITY g/cc | DCS MPa |
| F-6 | 0 | 8 | 2.2405 | 0.4162 |
| " | " | 16 | 2.3476 | 0.7380 |
| " | " | 24 | 2.3891 | 0.8619 |
| " | 20 | 8 | 2.2762 | 0.4726 |
| " | " | 16 | 2.3661 | 0.7518 |
| " | " | 24 | 2.4161 | 0.9211 |
| " | 52 | 8 | 2.3164 | 0.5065 |
| " | " | 16 | 2.4038 | 0.6621 |
| " | " | 24 | 2.4555 | 1.1905 |
| C | 0 | 8 | 2.2376 | 0.2066 |
| " | " | 16 | 2.3452 | 0.4641 |
| " | " | 24 | — | — |
| " | 20 | 8 | 2.4149 | 0.2105 |
| " | " | 16 | 2.3606 | 0.4142 |
| " | " | 24 | 2.4181 | 0.5815 |
| " | 52 | 8 | 2.2929 | 0.1805 |
| " | " | 16 | 2.3999 | 0.3457 |
| " | " | 24 | — | — |

EXAMPLE 6

To demonstrate the effects of ethylene oxide content on compaction and strength properties of the polyethers alone and in combination with a film-forming reinforcing polymer, several additional materials were investigated. These binders were applied at 5% on A152SG alumina (Alcoa) and spray dried at 250° C. as explained under TEST METHODS. The powders were equilibrated at 20% R.H. before pressing and test pieces were equilibrated at 20% R.H. before testing. These materials are described in the following tables:

| Polyether | Polyether Type | wt. % PO | M.W. × 0.001 |
|---|---|---|---|
| I | EO-PO-EO | 60 | 4.7 |
| J | EO-PO-EDA-PO-EO | 60 | 10.5 |
| K | PO-EO-PO | 20 | 7.0 |
| L | PO-EO-EDA-EO-PO | 20 | 10.2 |
| M | EO-PO-sorbitol-PO-EO | 90 | 9.9 |
| N | EO-PO-sorbitol-PO-EO | 80 | 10.8 |
| O | EO-PO-sorbitol-PO-EO | 70 | 11.7 |
| P | EO-PO-EO | 90 | 4.4 |
| Q | EO-PO-EO | 80 | 4.8 |
| R | EO-PO-EO | 70 | 5.2 |

BINDER COMPOSITIONS

| Binder | Polyether | wt. % Polyether | wt. % Surtynol 104 | wt. % PVP K-30 |
|---|---|---|---|---|
| A-1 | A | 98.0 | 2.0 | 0 |
| A-2 | A | 78.4 | 1.6 | 20.0 |
| B-1 | B | 98.0 | 2.0 | 0 |
| B-2 | B | 78.4 | 1.6 | 20.0 |
| I-1 | I | 98.0 | 2.0 | 0 |
| I-2 | I | 78.4 | 1.6 | 20.0 |
| J-1 | J | 98.0 | 2.0 | 0 |
| J-2 | J | 78.4 | 1.6 | 20.0 |
| K-1 | K | 98.0 | 2.0 | 0 |
| K-2 | K | 78.4 | 1.6 | 20.0 |
| L-1 | L | 98.0 | 2.0 | 0 |
| L-2 | L | 78.4 | 1.6 | 20.0 |
| M-1 | M | 98.0 | 2.0 | 0 |
| M-2 | M | 78.4 | 1.6 | 20.0 |
| N-1 | N | 98.0 | 2.0 | 0 |
| N-2 | N | 78.4 | 1.6 | 20.0 |
| O-1 | O | 98.0 | 2.0 | 0 |
| O-2 | O | 78.4 | 1.6 | 20.0 |

-continued
BINDER COMPOSITIONS

| Binder | Polyether | wt. % Polyether | wt. % Surtynol 104 | wt. % PVP K-30 |
|---|---|---|---|---|
| P-1 | P | 98.0 | 2.0 | 0 |
| P-2 | P | 78.4 | 1.6 | 20.0 |
| Q-1 | Q | 98.0 | 2.0 | 0 |
| Q-2 | Q | 78.4 | 1.6 | 20.0 |
| R-1 | R | 98.0 | 2.0 | 0 |
| R-2 | R | 78.4 | 1.6 | 20.0 |

PERFORMANCE DATA:

| Binder | Pressure (psi × 0.001) | Green Density (g/cc) | DCS(MPa) |
|---|---|---|---|
| A-1 | 10 | 2.367 | 0.082 |
| " | 15 | 2.408 | 0.062 |
| " | 20 | 2.424 | 0.049 |
| A-2 | 10 | 2.358 | 0.177 |
| " | 15 | 2.378 | 0.151 |
| " | 20 | 2.419 | 0.252 |
| B-1 | 10 | 2.303 | 0.173 |
| " | 15 | 2.343 | 0.201 |
| " | 20 | 2.372 | 0.130 |
| B-2 | 10 | 2.288 | 0.406 |
| " | 15 | 2.332 | 0.544 |
| " | 20 | 2.382 | 0.373 |
| I-1 | 10 | 2.335 | 0.029 |
| " | 15 | 2.382 | 0.035 |
| " | 20 | 2.409 | 0.073 |
| I-2 | 10 | 2.381 | 0.163 |
| " | 15 | 2.379 | 0.176 |
| " | 20 | 2.407 | 0.110 |
| J-1 | 10 | 2.381 | 0.058 |
| " | 15 | 2.406 | 0.083 |
| " | 20 | 2.429 | 0.073 |
| J-2 | 10 | 2.350 | 0.228 |
| " | 15 | 2.390 | 0.318 |
| " | 20 | 2.422 | 0.301 |
| K-1 | 10 | 2.346 | 0.191 |
| " | 15 | 2.385 | 0.290 |
| " | 20 | 2.413 | 0.251 |
| K-2 | 10 | 2.300 | 0.364 |
| " | 15 | 2.348 | 0.364 |
| " | 20 | 2.384 | 0.303 |
| L-1 | 10 | 2.381 | 0.163 |
| " | 15 | 2.411 | 0.355 |
| " | 20 | 2.428 | 0.371 |
| L-2 | 10 | 2.325 | 0.531 |
| " | 15 | 2.372 | 0.653 |
| " | 20 | 2.407 | 0.532 |
| M-1 | 10 | 2.350 | 0.004 |
| " | 15 | 2.380 | 0.004 |
| " | 20 | 2.402 | 0.004 |
| M-2 | 10 | 2.329 | 0.021 |
| " | 15 | 2.364 | 0.018 |
| " | 20 | 2.404 | 0.024 |
| N-1 | 10 | 2.330 | 0.004 |
| " | 15 | 2.379 | 0.004 |
| " | 20 | 2.391 | 0.004 |
| N-2 | 10 | 2.319 | 0.016 |
| " | 15 | 2.362 | 0.063 |
| " | 20 | 2.386 | 0.051 |
| O-1 | 10 | 2.372 | 0.004 |
| " | 15 | 2.401 | 0.004 |
| " | 20 | 2.423 | 0.004 |
| O-2 | 10 | 2.350 | 0.060 |
| " | 15 | 2.385 | 0.053 |
| " | 20 | 2.410 | 0.076 |
| P-1 | 10 | 2.340 | 0.004 |
| " | 15 | 2.377 | 0.004 |
| " | 20 | 2.425 | 0.004 |
| P-2 | 10 | 2.329 | 0.031 |
| " | 15 | 2.365 | 0.008 |
| " | 20 | 2.391 | 0.013 |
| Q-1 | 10 | 2.337 | 0.004 |
| " | 15 | 2.367 | 0.004 |
| " | 20 | 2.384 | 0.004 |
| Q-2 | 10 | 2.318 | 0.057 |
| " | 15 | 2.358 | 0.042 |
| " | 20 | 2.385 | 0.061 |
| R-1 | 10 | 2.361 | 0.004 |
| " | 15 | 2.384 | 0.004 |
| " | 20 | 2.411 | 0.004 |
| R-2 | 10 | 2.331 | 0.067 |
| " | 15 | 2.363 | 0.079 |
| " | 20 | 2.386 | 0.053 |

These data show that polyethers containing no propylene oxide and that those composed mainly of propylene oxide (>60%) are inferior to those containing the preferred range (20–30%). Indeed, those containing significant amounts of propylene oxide yield extremely weak compacts. Although the performance of all of the polyethers is improved by the reinforcing polymer, the differences between the preferred block copolymers and copolymers lying outside the preferred composition range are still apparent.

EXAMPLE 7

To demonstrate that film-forming polymers in general can be used in conjunction with the preferred EO-PO block copolymers, a number of the former were formulated with Polyether F. All of the following binder formulas consist of 78.4% Polyether F, 1.6% Surfynol 104 and 20.0% film-forming polymer as set out in the following table. The formulated binders were applied at 5% (based on A152SG alumina) and spray dried at 250° C. as in Example 2. Powders and test cylinders were equilibrated at 20% R.H.

| COMPO-SITION | FILM-FORMER | TRADE-NAME |
|---|---|---|
| F-11 | polyvinyl alcohol, 87-89% hydrolyzed, M.W. 31-50 × 10³ | Airvol 205[1] |
| F-12 | polyvinyl alcohol, 87-89% hydrolyzed, M.W. 85-146 × 10³ | Airvol 523[1] |
| F-13 | copoly(vinyl acetate-N-vinylpyrrolidinone) (70:30) | PVP/VA S-630[2] |
| F-14 | copoly(vinyl acetate-N-vinylpyrrolidinone) (60:40) | PVP/VA E-735[2] |
| F-15 | copoly(styrene-N-vinylpyroolidinone) | Polectron 430[2] |

[1]Air Products and Chemicals Corp.;
[2]GAF Chemicals Corp.

These data demonstrate excellent performance of the preferred PO-EO block copolymers when formulated with various film-forming synthetic polymers.

PERFORMANCE DATA:

| Binder | Pressure (psi × 0.001) | Green Density (g/cc) | DCS(MPa) |
|---|---|---|---|
| F-6 | 5 | 2.221 | 0.367 |
| " | 10 | 2.324 | 0.628 |
| " | 15 | 2.384 | 0.852 |
| " | 20 | 2.414 | 0.920 |
| " | 25 | 2.432 | 0.973 |
| F-11 | 5 | 2.197 | 0.300 |
| " | 10 | 2.313 | 0.556 |
| " | 15 | 2.368 | 0.767 |
| " | 20 | 2.411 | 0.926 |
| " | 25 | 2.431 | 0.953 |

-continued

PERFORMANCE DATA:

| Binder | Pressure (psi × 0.001) | Green Ceramic Properties | |
|---|---|---|---|
| | | Green Density (g/cc) | DCS(MPa) |
| F-12 | 5 | 2.119 | 0.192 |
| " | 10 | 2.257 | 0.420 |
| " | 25 | 2.398 | 0.828 |
| F-13 | 5 | 2.219 | 0.315 |
| " | 10 | 2.331 | 0.607 |
| " | 15 | 2.384 | 0.752 |
| " | 20 | 2.417 | 0.879 |
| " | 25 | 2.439 | 0.925 |
| F-14 | 5 | 2.238 | 0.268 |
| " | 10 | 2.344 | 0.532 |
| " | 15 | 2.389 | 0.663 |
| " | 20 | 2.424 | 0.770 |
| " | 25 | 2.444 | 0.823 |
| F-15 | 5 | 2.209 | 0.281 |
| " | 10 | 2.334 | 0.647 |
| " | 15 | 2.386 | 0.768 |
| " | 20 | 2.422 | 0.875 |
| " | 25 | 2.443 | 0.972 |

What is claimed is:

1. A method of preparing a shaped ceramic object wherein the improvement comprises incorporating in the spray dried ceramic powder a binder composition that comprises a copolymer comprising blocks of ethylene oxide and propylene oxide ether-linked to (1,2-ethandiyldinitrilo)tetrakis.

2. The method of claim 1 wherein the binder composition also contains a film forming polymer.

3. The method of claim 2 wherein the film forming polymer is a homopolymer or copolymer of N-vinylpyrrolidinone.

4. The method of claim 2 wherein the film forming polymer is a homopolymer or copolymer of vinyl alcohol.

5. The method of claim 1 that also comprises an antifoaming agent.

6. The method of claim 1 wherein the copolymer comprises 20–30 weight percent propylene oxide and 80–70 weight percent ethylene oxide.

7. The method of claim 1 wherein the molecular weight of the copolymer is in the range of about 5,000 to about 20,000.

* * * * *

UNITED STATES PATENT AND TRADEMARK OFFICE
CERTIFICATE OF CORRECTION

PATENT NO. : 5,324,770
DATED : JUNE 28, 1994
INVENTOR(S) : DAVID R. COSPER

It is certified that error appears in the above-indentified patent and that said Letters Patent is hereby corrected as shown below:

COLUMN 12, CLAIM 1, LINE 6 ethandiyldinitrilo)tetrakis.

LETTERS PATENT SHOULD READ AS:

ethandiyldinitrilo)tetrakis[propanol].

Signed and Sealed this

Twentieth Day of May, 1997

Attest:

BRUCE LEHMAN

Attesting Officer

Commissioner of Patents and Trademarks